United States Patent Office 3,023,244
Patented Feb. 27, 1962

3,023,244
PROCESS FOR MAKING PINONIC ALDEHYDE

Habib-Emile Eschinazi, Montclair, N.J., now by judicial change of name Emile Haviv Eschinasi, assignor to The Givaudan Corporation, New York, N.Y., a corporation of New Jersey
No Drawing. Filed Apr. 2, 1959, Ser. No. 803,593
7 Claims. (Cl. 260—586)

This invention relates to an improved process for preparing pinonic aldehyde.

Pinonic aldehyde is used in the perfume and flavor industries on account of its desirable olfactory characteristics. Its chemical formula is: 2,2-dimethyl-3-acetyl-cyclobutylacetaldehyde.

Known methods for preparing pinonic aldehyde are characterized by inconsistency of results. Even where best results are reported, the yields obtainable by known methods are low, and the desired aldehyde is accompanied by degradation products.

In accordance with the present invention, a technically-simple and commercially-feasible process for preparing pinonic aldehyde is provided by ozonization of α-pinene in the presence of a participating solvent that reacts with the ozonide and participates in the formation of an intermediate peroxyaldehyde which we refer to as the ozonizate. The latter is then reduced and hydrolyzed to pinonic aldehyde.

The instant process may be represented as follows:

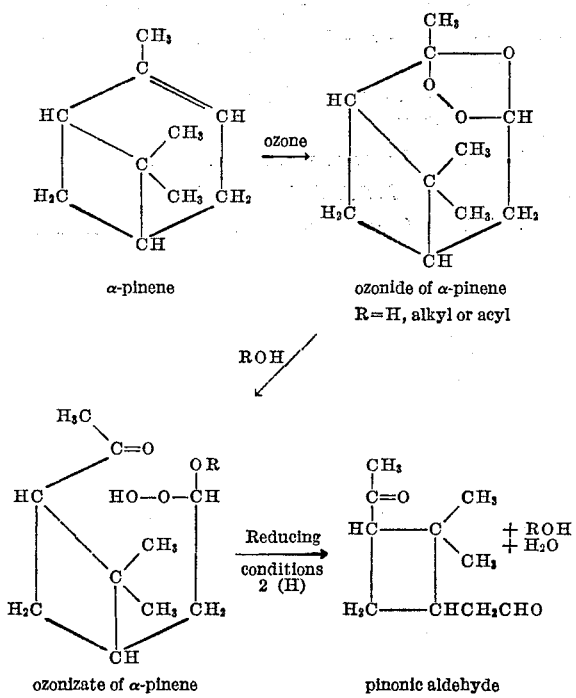

In general, in conducting the novel process of this invention, ozone is passed through α-pinene in the presence of a so-called participating solvent at a reduced temperature until ozone is no longer absorbed. The reaction mixture is then transferred to a suitable reaction vessel, equipped for reflux under agitation and for the introduction of material while under reflux. The ozonizate formed during the ozone treatment is converted into the desired pinonic aldehyde in the presence of a water-immiscible solvent under reducing conditions, in the presence of water. Reducing conditions are used in order to destroy hydrogen peroxide as it is formed, so that the desired pinonic aldehyde is protected from oxidation, etc.

In conducting the ozone reaction of the present process, ozone, either in pure form or diluted in air or oxygen, is used. As the participating solvent, a preferably water-miscible material having the formula ROH, where R is H, alkyl or acyl, may be used. Examples of such solvents are water, methanol or its higher homologs, acetic acid or its higher homologs are used. If desired, the solvents may be used per se or in admixture. In general it is preferred to use a solvent consisting of water and either an alcohol, like methanol, or an acid such as acetic acid.

The proportion of the materials used in the ozone reaction may be varied, within limits. To one part by weight of α-pinene, one may use a total of from about 1 to about 3 parts by weight of the participating solvent. However, 1 to 1½ parts of solvent, on the same basis, are preferred. With respect to the ratio of component solvents used in those cases where mixtures of solvents are employed, while any ratio will give satisfactory results, it is preferred to use from about ⅓ to 1 part by weight of water to 1 part of the other component solvent.

The ozone or ozone mixture is used until it bleeds out of the reaction mixture, i.e., until the ozone is no longer absorbed.

Temperatures from about −15° C. to about 50° C. give satisfactory results for the ozone reaction. However, temperatures within the range from about 5° C. to about 15° C. give especially advantageous results.

With regard to the decomposition of the ozonizate, reducing conditions may vary so long as enough reducing agent is supplied to reduce the peroxide ($H_2O_2$) formed during the freeing of the aldehydic groups. Examples of agents which give the desired reducing conditions are zinc plus mineral acid, preferably sulfuric acid; sodium bisulfite, and hydrogen in the presence of a hydrogenation catalyst. The water-immiscible solvents which may be used include benzene and halogenated hydrocarbon solvents.

With regard to proportions of materials used in conducting the ozonizate decomposition, they may also be varied, within limits. To each mol of the ozonizate, from about 0.5 to about 2.0 mols of reducing agent (i.e., an agent which can supply atomic hydrogen in situ), may be used, although from about 1 to about 1¼ mols is especially desirable. On the same mol basis of ozonizate, from 0.5 to about 5.0 parts of solvent can be used, although about 1.5 to about 3.0 parts are preferred. The amount of water in the mix should be from about 1 to about 10 parts that of the ozonizate, about 4 to about 7 parts being the preferred range.

The ozonizate decomposition may be conducted over a wide temperature range, for example, from about 0° C. to about 100° C. It is generally preferred to conduct this reaction under reflux conditions. When temperatures near 0° C. are used the reaction time is about 1 hour. Temperatures near 100° C. enable the reaction to be substantially completed in about 5 minutes. It has been found that, in general, reflux conditions result in reaction periods of from about 5 to about 10 minutes.

The invention is illustrated by the following examples, without however, limiting the same to them.

Example I 136 g. of α-pinene, 120 ml. methanol and 60 ml. of water were placed in a 500 ml. reaction vessel cooled from the outside with an ice-water bath, while a stream of ozonized oxygen, from a commercial "Welsbach" T 23 ozonator and containing approximately 70–75 mg. ozone per liter, was fed at the rate of 100 liters/hour through a glass, porous pipe dipped into the mixture. After about 7 hrs., the ozone started bleeding out with the outgoing gases and the ozonization was stopped. The reaction mixture was then transferred into a 2-liter flask equipped with a stirrer, a reflux condenser and a dropping funnel and containing 500 ml. water, 50 ml. benzene and 65 g. zinc dust. Then 160 g. 62% sulfuric acid was added under agitation within 5–10 minutes. The reaction mixture started to boil vigorously and was kept under agitation for 10 more minutes. After cooling, the layers are separated and the bottom layer extracted twice with 100 ml. benzene. The combined organic layers are now neutralized with soda ash and the solvent evaporated, leaving behind 140 g. of crude pinonic aldehyde showing a purity of approximately 90% by oximation.

Upon distillation in a 1½-ft. column, approximately 10% of a light cut is obtained followed by about 113 g. of pure pinonic aldehyde boiling at 93° at 3 mm., $n_D^{20}$ 1.4610, $\alpha_D$ 40° showing 98.5% purity by oximation.

*Example II*

136 g. of α-pinene, 60 ml. acetic acid and 120 ml. of water were placed in a 1000 ml. reaction vessel and a stream of ozonized air from a commercial "Welsbach" T 23 ozonator and containing approximately 35–40 mg. ozone per liter was fed at a rate of 60 liters per hour through a porous glass pipe dipped into the reaction mixture which is maintained at 20° by outside water cooling. After about 15 hours, unreacted ozone started bleeding out. Then to the reaction mixture were added 500 ml. water followed by the portionwise addition of about 78 g. sodium bisulfite until no more hydrogen peroxide was present, i.e., until a sample of the reaction mixture liberates no more iodine from a 2% K I solution. The organic top layer is separated from the bottom layer which is extracted with a water immiscible solvent such as carbon tetrachloride or benzene. The extract is combined with the top layer, neutralized with soda ash and evaporated. Upon distillation a main cut boiling at 90–94° at 2.5 mm. weighing 70–80 g., $n_D^{20}$ 1.4606–1.4612 is obtained and consists of 95–98% pinonic aldehyde.

The foregoing illustrates the practice of this invention which, however, is to be construed and limited solely by the appended claims.

I claim:

1. The process for preparing pinonic aldehyde, which comprises reacting alpha-pinene with ozone in the presence of at least one water-miscible solvent having the formula, ROH, where R is a member selected from H, alkyl and the acyl radical of a carboxylic acid, and subjecting the resulting ozonizate of alpha-pinene to a temperature within the range from about 0° C. to about 100° C. in the presence of a reducing agent, water and a water-immiscible solvent.

2. The process of claim 1, wherein a mixture of water and methanol is used as the water-miscible solvent.

3. The process of claim 1, wherein the reducing agent is provided by the action of zinc on sulfuric acid.

4. The process of claim 1, wherein said reaction of alpha-pinene and ozone is conducted within the temperature range from about 5° to about 20° C.

5. The process of claim 1, wherein the ozonizate is heated under reflux conditions.

6. The process for preparing pinonic aldehyde, which comprises reacting about 1 part of alpha-pinene and about 1 to about 1½ parts of a solvent comprising about 1 part of methanol and ⅓ to about 1 part of water, with ozone, at a temperature within the range from about 5° C. to about 15° C., until absorption of ozone ceases; and decomposing the resulting ozonizate under reflux under reducing and hydrolyzing conditions provided by the action of zinc on sulfuric acid in the presence of benzene.

7. The process for preparing pinonic aldehyde, which comprises reacting about 1 part of alpha-pinene and about 1 to about 1½ parts of a solvent comprising about 1 part of water and ⅓ to about 1 part of acetic acid with ozone, at a temperature within the range from about 5° C. to about 15° C., until absorption of ozone ceases; and decomposing the resulting ozonizate under reflux under reducing and hydrolyzing conditions provided by sodium bisulfite.

References Cited in the file of this patent

UNITED STATES PATENTS 2,750,411    Fisher et al. _____ June 12, 1956

FOREIGN PATENTS 27,371    Great Britain _____ 1912